(No Model.)
H. A. JAMIESON.
Pump.
No. 229,612. Patented July 6, 1880.
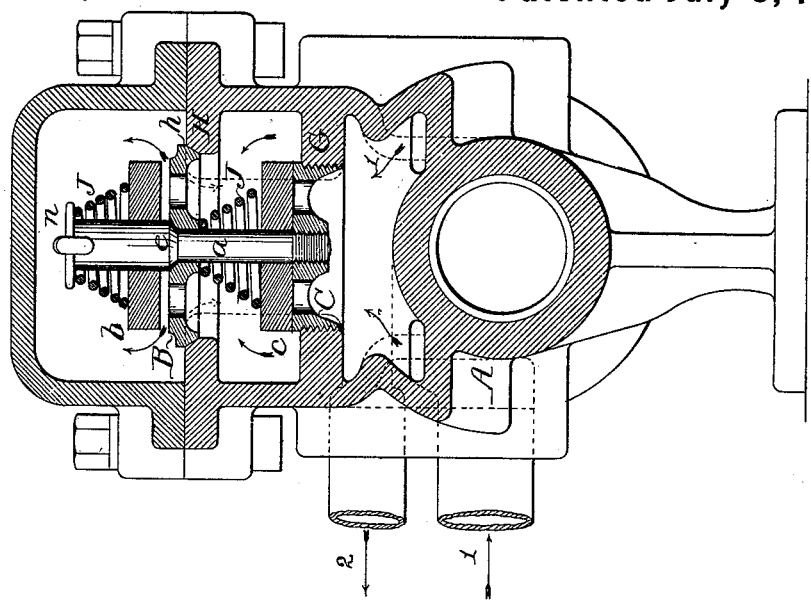
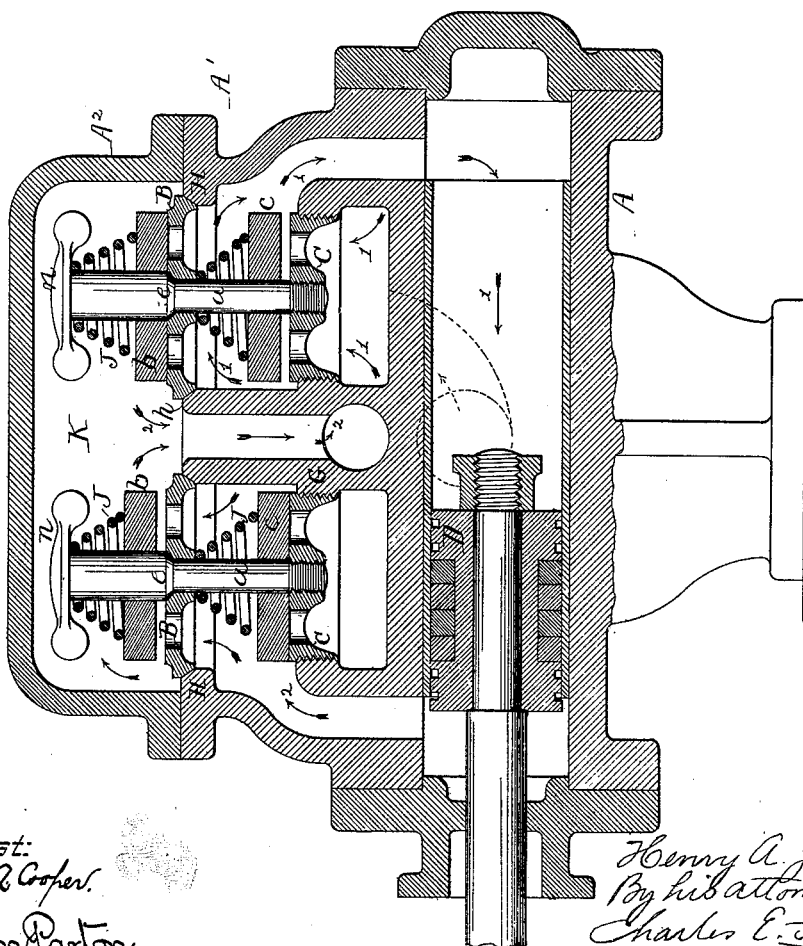
Attest:
Courtney A. Cooper
William Paxton
Henry A. Jamieson
By his attorney
Charles E. Foster
N. PETERS, PHOTO-LITHOGRAPHER, WASHINGTON, D. C.

UNITED STATES PATENT OFFICE.

HENRY A. JAMIESON, OF BROOKLYN, NEW YORK.

PUMP.

SPECIFICATION forming part of Letters Patent No. 229,612, dated July 6, 1880.

Application filed April 23, 1880. (No model.)

*To all whom it may concern:*

Be it known that I, HENRY A. JAMIESON, of Brooklyn, Kings county, New York, have invented an Improvement in Pumps, of which the following is a specification.

My invention is an improvement in pumps; and it consists in making the valve-chests, valve-seats, and connections, as fully described hereinafter, so as to simplify the construction, facilitate the attachment of the parts to their places, and permit ready access thereto.

In the drawings forming part of this specification, Figure 1 is a longitudinal section of a pump-cylinder and chest, showing my invention. Fig. 2 is a transverse section.

The cylinder A, the chest A', containing the inlet and outlet ports and passages, and cap $A^2$, containing the discharge-chamber K, as shown, do not differ materially from ordinary constructions, and may be varied as occasion requires. D is the piston, reciprocating in the cylinder.

Within the chest A' are the seats C C B B of the valves $c\ c\ b\ b$, the lower being the inlet and the upper the outlet valves. Each seat C is threaded externally and adapted to a threaded opening in the lower partition, G, of the chest, and each seat B has a beveled edge, $h$, ground to fit the beveled edge of an opening in the upper partition, H.

A stem, $a$, threaded at the lower end, screws into a threaded socket in each valve-seat C, and is enlarged toward the upper end to form an annular shoulder, $e$, which is beveled and ground to a central bearing of the valve-seat B, through which the stem passes.

The valves $c$ play upon the lower ends of the stems, and are pressed upon their seats by volute springs J, bearing at their upper ends against the seats B, and the valves $b$ are depressed by similar springs J, having their upper bearings against cross-bars $n$, which serve as ready means for turning the stems to bring each beveled shoulder $e$ to bear firmly upon its valve-seat B, thereby forcing the beveled edge of the latter into close contact with the edge of its socket.

Either valve-seat B may be readily removed by unscrewing the stem $a$, thereby affording easy access to the seat, valve, and spring below, while in replacing the parts no nice adjustment is required, as each will fit in place when turned to any position, and snug bearings at all points are secured by the simple turning of the stem.

It will be noted that the seats B B constitute division-plates between the chambers in the chest and the discharge-chamber K, and it will be apparent that the above-described construction may be made use of, irrespective of the number of valves and seats employed, and that the seats B may be secured by shouldered stems, as described, in cases where the seats C are not detachable, but constitute part of the casting.

In some cases the shoulders $e$ may be abrupt, and packings may be placed beneath them; but I prefer the form shown. The seats B may also have flat bearings.

The arrows 1 indicate the incoming currents, and the arrows 2 the discharge-currents.

I claim—

1. The combination, in a pump, of a beveled-edged seat, B, adapted to a corresponding opening, and a stem, $a$, screwing into a seat below the seat B, and provided with an annular beveled shoulder, $e$, adapted to a corresponding bearing of the valve-seat B, substantially as set forth.

2. The combination, in a pump, of the threaded seats C, detachable seats B, valves $b\ c$, and stems $a$, having shoulders $e$ and threaded lower ends, substantially as set forth.

3. The stems $a$, threaded at the ends, provided with shoulders $e$ and cross-heads $n$, in combination with the valve-seats B C, valves $b\ c$, and springs, substantially as set forth.

4. The valve-chest, its partition G, threaded opening and seat C, partition H, having a beveled opening affording a bearing for the seat B, in combination with the shouldered stem $a$ and spring-valves, constructed substantially as set forth.

In testimony whereof I have signed my name to this specification in the presence of two subscribing witnesses.

HENRY A. JAMIESON.

Witnesses:
 EDWARD FUCHS,
 GEORGE H. PRICE.